United States Patent Office 3,518,210
Patented June 30, 1970

3,518,210
BARK-PHENOL-ALDEHYDE MOLDING COM-
POUNDS AND RESINS AND METHODS OF
FORMING SAME
Joel J. Edelstein, West Hartford, and John M. De Bell,
Enfield, Conn., and Charles H. Parker, Monson, Mass.,
assignors to U.S. Plywood-Champion Papers Inc., Ham-
ilton, Ohio, a corporation of New York
No Drawing. Continuation-in-part of application Ser. No.
510,368, Nov. 29, 1965. This application July 3, 1969,
Ser. No. 839,055
Int. Cl. C08g 51/18
U.S. Cl. 260—17.2                                30 Claims

ABSTRACT OF THE DISCLOSURE

An infusible resin formed by reaction of a phenol-aldehyde condensation product with a bark derivative produced by acidification of the product formed when tree bark is heated with an alkali metal hydroxide to a temperature of about 200° C. to 260° C. in the absence of oxygen, the reaction taking place in the presence of an aldehyde source.

---

This is a continuation-in-part of our co-pending application, Ser. No. 510,368, filed Nov. 29, 1965, now abandoned.

This invention relates to improved molding compounds and infusible resins and to methods of forming improved molding compounds and infusible resins.

In the patent of Philip S. Blickensderfer et al., No. 3,371,054, issued Feb. 27, 1968, are disclosed and claimed reactive products of tree bark formed by heating the bark with an alkali metal hydroxide to a temperature between about 200° and 260° C., in the absence of oxygen followed by acidification thereof. Such materials are known as acid bark or bark phenolic acids.

An object of this invention is to provide new uses for such bark phenolic acids.

A further object of this invention is to provide a method of using such bark phenolic acids directly in forming molding compounds and infusible resins without initially condensing them with formaldehyde or a formaldehyde donor.

A further object of this invention is to provide a method of forming molding compounds and infusible resinous moldings using substantial proportions of bark phenolic acids, which is speedy and economical.

A further object of this invention is to provide improved theremosetting molding compounds and infusible thermoset resins which incorporate substantial proportions of such bark phenolic acids.

It has been found that such bark phenolic acids can react as condensed resins directly with uncured phenolic resins, commonly called "phenoplasts" to form infusible resins. Phenoplasts are well-known materials forming a variety of resin products and are described in Carswell, Phenoplasts (New York 1947). By the term "phenoplast" is meant the reaction product of a reactive phenol, either monohydric or polyhydric, and an aldehyde such as formaldehyde or the higher aldehydes as discussed in chapter 3 of Carswell, Phenoplasts, supra. The materials referred to as phenoplasts can also be referred to as phenolaldehyde condensation products. The phenol can be selected from a broad range of materials such as phenol, cresol, and the polyhydric phenols discussed in chapter 4 of Carswell, supra. The bark phenolic acids are resins and can properly be referred to as bark phenolic acid resins. They react with both resole and novolac type uncured resins. In admixture with such phenoplasts or phenol-aldehyde condensation products, the bark phenolic acid resins react as condensed resins without need for an initial precondensation with formaldehyde. With the novolac type, a sufficient amount of an aldehyde or an aldehyde donor or source is incorporated to supply the aldehyde needed for curing. In practice, hexamethylene-tetramine as the aldehyde donor is the preferred material. The amount of aldehyde source required for the bark phenolic acid resin would be approximately equivalent to that required to cure a similar amount or weight of a novolac resin.

When a bark phenolic acid resin is in admixture with a resole resin, the resole resin can act as the aldehyde source or an additional aldehyde source can be added if required. The bark phenolic acid resin is mixed with a commercial phenol-aldehyde condensation product or phenoplast and, when needed, a sufficient amount of an aldehyde donor such as hexamethylenetetramine or para-formaldehyde to form a thermosetting molding compound which can be loaded in a mold and heated and cured directly. If desired, an appropriate filler such as wood flour, powdered mica, cotton flock, walnut shell flour or charcoal can be mixed with or incorporated in the molding compound. Other usual additives including acid acceptors, such as zinc oxide, calcium hydroxide or magnesium oxide or the like and lubricants, such as calcium stearate and other additives common in molding techniques can also be incorporated in the molding compound.

The following examples are given to illustrate the invention in greater detail, but it is to be understood that the examples are given primarily by way of example, rather than by way of limitation, and the invention is now intended to be limited thereby except as set forth in the claims. In the following examples and in the remainder hereof, all parts and percentages are taken by weight.

EXAMPLE I 1000 parts of mill run Southern yellow pine bark, consisting chiefly of bark of loblolly pine (*Pinus taeda*) and shortleft pine (*Pinus echinata*) were reduced in a hammer mill to a maximum size or dimension of ¾ inch and then fed to a commercial disc refiner or attrition mill. The attrition mill product was separated using a metal deck screen having ³⁄₆₄ inch diameter openings, and the material held by the screen was passed through a second attrition mill. The second attrition mill product was separated using a metal deck screen having ¹⁄₁₆ inch diameter openings. This fine material passing the screens was collected to form 550 parts of dry pine bark fines.

1000 parts of the dry pine bark fines were mixed with 87 parts of 38% aqueous solution of sodium hydroxide. The mixture was allowed to stand overnight. The mixture was then heated at a temperature of approximately 230° C. and held at the temperature for 90 minutes under a nitrogen blanket with stirring, using an external heater, to drive off volatile or gaseous materials and form 110 parts of alkali bark in powder form. The total heating time was 3 hours. A sample of the alkali bark was continuously extracted in a Soxhlet extractor with hot water. Over 90% of the sample was found to be soluble in the hot water.

110 parts of the alkali bark were added to 440 parts of water in a kettle with agitation to form a smooth slurry or dispersion, constituents of which were the soluble values in solution and the dispersed insoluble values. Commercial concentrated sulfuric acid (66° Bé) was slowly added with agitation. Acid addition was continued until a pH of 3 was obtained. Approximately 39 parts of sulfuric acid were used. The batch was filtered thereby separating the insoluble bark phenolic acid resin from the soluble ingredients. The filter cake was slurried in 240 parts of fresh water and again filtered to remove sodium sulfate and dried at about 70° C. overnight to remove moisture and to produce 65 parts of bark phenolic acid resin.

EXAMPLE II 45 parts of the bark phenolic acid resin of Example I, 45 parts of General Electric I P 73 (a trademark of The General Electric Company) resin, a commercially available high flow solid novolac, 10 parts of hexamethylenetetramine, 100 parts of wood flour, 2 parts of zinc oxide powder, and 2 parts of powdered calcium stearate were intimately mixed in a jar rolling mill for 3 hours to form a uniform powder blend. The powder blend was charged to a two roll differential speed mill having rolls heated to a temperature maintained between 120° C. and 135° C. and allowed to band and flux on the rolls for approximately 25 seconds. The fluxed blend was then cooled to room temperature and reduced to a granulated molding powder. The molding powder was charged to a compression mold and molded at a temperature of 165° C. and under a pressure of 4000 pounds per square inch for 3 minutes to form a molded piece. The molded piece was tested in accordance with ASTM D–790 and found to have a flexural strength of 10,100 pounds per square inch and 1,140,000 pounds per square inch modulus of elasticity in bending or flexural modulus.

EXAMPLE III 50 parts of the bark phenolic acid resin of Example I, 50 parts of Union Carbide liquid phenol formaldehyde resin BRZ 7541 (a trademark of the Union Carbide Corp.), a commercially available novolac resin, 10 parts of hexamethylenetetramine, 100 parts of wood flour, 2 parts of zinc oxide powder and 2 parts of powdered calcium stearate were intimately mixed in a Waring Blendor for 5 minutes to form a uniform blend. The blend was charged to a two roll differential speed mill having rolls heated to a temperature maintained between 70° C. and 80° C. and allowed to band and flux on the rolls for approximately 25 seconds. The fluxed blend was then cooled to room temperature and reduced to a granulated molding powder. The molding powder was charged to a compression mold and molded at a temperature 165° C. and under a pressure of 2500 pounds per square inch for 3 minutes to form a molded piece. The molded piece was tested in accordance with ASTM D–790 and found to have a flexural strength of 9500 pounds per square inch and 1,200,000 pounds per square inch flexural modulus.

EXAMPLE IV 45 parts of the bark phenolic acid resin of Example I, 45 parts of Durez 18052 (a trademark of Hooker Chemical Company), a commercially available high flow solid novolac, 10 parts of hexamethylenetetramine, 100 parts of wood flour, 2 parts of zinc oxide powder, and 2 parts of powdered calcium stearate were intimately mixed in a jar rolling mill for 3 hours to form a uniform powder blend. The powder blend was charged to a two roll differential speed mill having rolls heated to a temperature maintained between 120° C. and 135° C. and allowed to band and flux on the rolls for approximately 25 seconds. The fluxed blend was then cooled to room temperature and reduced to a granulated molding powder. The molding powder was charged to a compression mold and molded at a temperature of 165° C. and under a pressure of 4000 pounds per square inch for 3 minutes to form a molded piece. The molded piece was tested in accordance with ASTM D–790 and found to have a flexural strength of 9290 pounds per square inch and 930,000 pounds per square inch flexural modulus.

EXAMPLE V 45 parts of the bark phenolic acid resins of Example I, 45 parts of General Electric I P 73 (a trademark of The General Electric Company), 10 parts of hexamethylenetetramine, 2 parts of zinc oxide powder and 2 parts of powdered calcium stearate were intimately mixed in a jar rolling mill for 3 hours to form a uniform powder blend. The powder blend was charged to a two roll differential speed mill having rolls heated to a temperature maintained between 70° C. and 80° C. and allowed to band and flux on the rolls for approximately 25 seconds. The fluxed blend was then cooled to room temperature and reduced to a granulated molding powder. The molding powder was charged to a compression mold and molded at a temperature of about 165° C. and under a pressure of 2500 pounds per square inch for 3 minutes to form a molded piece.

EXAMPLE VI 181 parts of moist hardwood (deciduous) whole bark including 81 parts water and consisting of approximately equal parts of cottonwood, oak and elm barks were pulverized to pass a ¼ inch mesh standard screen. 66 parts of commercial 50% aqueous sodium hydroxide solution were added to and were intimately mixed with the moist pulverized bark. The mxiture was loaded in a kettle, and the mixture in the kettle was heated at a temperature of approximately 230° C. and held at that temperature for approximately 90 minutes under a nitrogen blanket with stirring using an external heater to drive off volatile or gaseous material and form 105 parts of alkali bark. The total heating time was 3 hours. The alkali bark was then reduced to a powder and was added to 440 parts of water in a kettle with agitation to form a smooth slurry. Commercial concentrated sulfuric acid was added slowly with agitation. Addition of sulfuric acid was continued until a pH of 3 was observed. The batch was then filtered. The filter cake was slurried with 240 parts of water and again filtered and dried at about 70° C. overnight to produce 60 parts of bark phenolic acid resin.

EXAMPLE VII 45 parts of the bark phenolic acid resin of Example VI, 45 parts of General Electric I P 73 (a trademark of The General Electric Company) solid novolac resin, 10 parts of hexamethylenetetramine, 100 parts of wood flour, 2 parts of zinc oxide powder and 2 parts of powdered calcium stearate were intimately mixed in a jar rolling mill for 3 hours to form a uniform powder blend. The powder blend was charged to a two roll differential speed mill having rolls heated to a temperature maintained between 120° C. and 135° C. and allowed to band and flux on the rolls for approximately 25 seconds. The fluxed blend was then cooled to room temperature and reduced to a granulated molding powder. The molding powder was charged to a compression mold and molded at a temperature of 165° C. and under a pressure of 4000 pounds per square inch for 3 minutes to form a molded piece. The molded piece was tested in accordance with ASTM D–790 and found to have a flexural strength of 8860 pounds per square inch.

EXAMPLE VIII 181 parts of the same mill run Southern yellow pine bark used in Example I were pulverized to pass a ¼ inch mesh standard screen. 66 parts of commercial 50% aqueous sodium hydroxide solution were added to and were intimately mixed with the pulverized bark. Then the mixture was loaded in a kettle and the mixture in the kettle was heated at a temperature of approximately 230° C. and held at that temperature for approximately 90 minutes under a nitrogen blanket with stirring using an external heater to drive off volatile or gaseous materials and form 105 parts of alkali bark. The total heating time was 3 hours. The alkali bark was then reduced to a powder and was added to 440 parts of water in a kettle with agitation to form a smooth slurry. Commercial concentrated sulfuric acid was added slowly with agitation. Addition of sulfuric acid was continued until a pH of 3 was observed. The batch was then filtered. The filter cake was slurried with 240 parts of water and again filtered and dried at 70° C. overnight to produce 60 parts of bark phenolic acid resin.

EXAMPLE IX 45 parts of the bark phenolic acid resin of Example VIII, 45 parts of General Electric I P 73 (a trademark of The General Electric Company) solid novolac resin, 10 parts of hexamethylenetetramine, 100 parts of wood flour, 2 parts of zinc oxide powder, and 2 parts of powdered calcium stearate were intimately mixed in a jar rolling mill for 3 hours to form a uniform powder blend. The powder blend was charged to a two roll differential speed mill having rolls heated to a temperature maintained between 120° C. and 135° C. and allowed to band and flux on the rolls for approximately 25 seconds. The fluxed blend was then cooled to room temperature and reduced to a granulated molding powder. The molding powder was charged to a compression mold and molded at a temperature of 165° C. and under a pressure of 4000 pounds per square inch for 3 minutes to form a melded piece. The molded piece was tested in accordance with ASTM D-790 and found to have a flexural strength of 10,200 pounds per square inch.

EXAMPLE X 50 parts of the bark phenolic acid resin of Example VIII, 50 parts on a solids basis of Resinox 544 (a trademark of Monsanto Company), a commercially available resole solution in alcohol, 100 parts of finely divided wood flour filler, 2 parts of zinc oxide powder and 2 parts of powdered calcium stearate were intimately mixed in a Waring Blendor for several minutes to form a uniform blend. The mixture was placed in a pan and dried in a circulating air oven at 60° C. for about 3 hours to produce a molding powder. The molding powder was charged to a compression mold and molded at a temperature of about 165° C. and under a pressure of 4,000 pounds per square inch for 3 minutes to form a molded piece. The molded piece was tested in accordance with ASTM D-790 and found to have a flexural strength of 8,800 pounds per square inch.

EXAMPLE XI 20 parts of the bark phenolic acid resin of Example VIII, 70 parts of Plenco 1155, phenolic resin (a trademark of Plastics Engineering Company) commercially available novolac resin, 15 parts of hexamethylenetetramine, 85 parts of wood flour, 5 parts asbestos, 2 parts of calcium hydroxide, 3 parts of calcium stearate and 2 parts nigrosine were intimately mixed in a planetary mixer for 3 hours to form a uniform powder blend. The powder blend was charged to a two roll differential speed mill having rolls heated to a temperature maintained between 120° C. and 135° C. and allowed to band and flux on the rolls for approximately 25 seconds. The fluxed blend was then cooled to room temperature and reduced to a granulated powder. The granulated powder was charged to a powder mixer and 5 parts of water were added slowly and mixing was continued until a homogenous molding powder mix was formed which was dry to the touch. The molding powder mix was charged to a compression mold and molded at a temperature of 165° C. and under a pressure of 4000 pounds per square inch for 3 minutes to form a molded piece. The molded piece was tested in accordance with ASTM D-790 and found to have a flexural strength of 10,100 pounds per square inch and 1,010,000 pounds per square inch modulus of elasticity in bending or flexural modulus.

The water in the composition of Example XI acts as a lubricant promoting flow of the molding compound in the mold. Substantially greater amounts of water than that shown in Example XI can cause blistering of the molded parts. The 5 parts of water of Example XI gives very good results. Up to 10 parts of water can be used satisfactorily with the other constituents of Example XI but greater amounts of water can cause undesirable blister formation and the 10 part level is approximately the limit of practicality.

In the practice of the invention it is preferred to use the bark from softwood (coniferous) trees, but bark of hardwood (deciduous) trees such as oak and cottonwood and other trees, which are commercially used in the United States for paper-making purposes can also be used. Mixtures of bark from coniferous and hardwood trees may also be used.

Good results are obtained when equal portions by weight of bark phenolic acid resin and a commercial phenoplast or phenol-aldehyde condensation product are used in combination, but greater or lesser proportions of bark phenolic acid resin can be used, and where the weight of the bark phenolic acid resin is from about 5 parts to about 400 parts per 100 parts of phenoplast or phenol-aldehyde condensation product, satisfactory results are obtained.

With commercial novolac-bark phenolic acid resin mixtures, a sufficient amount of an aldehyde source such as paraformaldehyde, or hexamethylenetetramine is used to supply the aldehyde necessary for curing the novolac and the bark phenolic acid resin. With a commercial resole-bark phenolic acid resin mixture, there may be sufficient aldehyde in the resole resin or additional aldehyde or an aldehyde donor can be added to supply the aldehyde required to cure the bark phenolic acid resin molding composition.

In the examples, wood flour has been shown as a filler, but other finely divided conventional fillers such as powdered mica, cotton flock, walnut shell flour or charcoal can be used or, if desired, the filler can be omitted. In practice about 10 percent to 75 percent by weight of the molding compound or composition can be filler.

Excellent results are obtained when the molding compound consists essentially of 50 to 200 parts of bark phenolic acid resin, 100 parts of phenol-aldehyde condensation product and 150 to 300 parts of finely divided wood flour.

In the examples, the use of sodium hydroxide is shown in the alkali heating or fusion of bark, but another alkali metal hydroxide such as potassium hydroxide can be used in place thereof. In the examples, use of sulfuric acid is shown in the acidification step, but other acids such as hydrochloric, phosphoric and nitric, can be used instead of sulfuric acid in this step. Bark phenolic acid resins may be formed from the non-fibrous fraction of the tree bark (tree bark fines), but whole tree bark can also be used in the formation of the bark phenolic acid resin.

From the foregoing description, it will be clear that various modifications can be made in the method of this invention without departing from the scope of the appended claims.

Having described the invention, what is claimed as new and desired to be secured by Letters Patent, is:

1. A thermosetting molding compound which consists essentially of a phenol-aldehyde condensation product, the resinous material produced by acidification of the product formed when tree bark is heated with an alkali metal hydroxide to a temperature between about 200° C. and 260° C. in the absence of oxygen, and a source of aldehyde.

2. A molding compound in accordance with claim 1 wherein the tree bark is from a coniferous tree.

3. A molding compound as in claim 1 wherein the phenol-aldehyde condensation product and the source of aldehyde is a resole.

4. A molding compound as in claim 1 wherein the phenol-aldehyde condensation product is a novolac.

5. A molding compound as in claim 1 wherein the source of aldehyde is hexamethylenetetramine.

6. A molding compound as in claim 1 wherein there is sufficient water to act as a lubricant, the amount of water being insufficient to cause blistering.

7. A molding compound as in claim 1 which includes a filler.

8. A molding compound as in claim 1 which includes about 5 to about 400 parts by weight bark phenolic acid resin per 100 parts of phenol-aldehyde condensation product.

9. A molding compound as in claim 1 which includes approximately 100 parts by weight of phenol-aldehyde condensation products, 50 to 200 parts of said resinous material and 150 to 300 parts of finely divided wood flour.

10. A molding compound as in claim 1 which includes approximately 45 parts by weight of novolac, 45 parts of said resinous material, 100 parts of food flour, and 10 parts of hexamethylenetetramine.

11. A method of forming a thermosetting molding compound which comprises forming an aldehyde-reactive bark phenolic acid resin from tree bark by a process which comprises mixing the bark with aqueous alkali metal hydroxide solution to form a mixture, heating said mixture in the absence of oxygen and at a temperature of approximately 200° C. to 260° C. to drive off volatile materials and form an alkali bark, forming an aqueous slurry of the alkali bark, acidifying the slurry to form a reactive bark phenolic acid resin, separating the bark phenolic acid resin and mixing the bark phenolic acid resin with a phenol-aldehyde condensation product and a sufficient amount of an aldehyde source to cure the resin mixture.

12. A method in accordance with claim 11 wherein the tree bark is from a coniferous tree.

13. A method as in claim 11 wherein substantially equal weights of bark phenolic acid and phenol-aldehyde condensation product are included.

14. A method as in claim 11 wherein the phenol-aldehyde condensation product and the source of aldehyde is a resole.

15. A method as in claim 11 wherein the phenol-aldehyde condensation product is a novolac.

16. The infusible product formed by the reaction of a phenol-aldehyde condensation product with the resinous material produced by acidification of the product formed when tree bark is heated with an alkali metal hydroxide to a temperature between about 200° C. and 260° C. in the absence of oxygen, said reaction taking place in the presence of a source of aldehyde.

17. A product in accordance with claim 16 wherein the tree bark is from a coniferous tree.

18. A product in accordance with claim 16 wherein the product includes from about 10 to 75% by weight of finely divided filler.

19. A product in accordance with claim 16 wherein the phenol-aldehyde condensation product is a novolac.

20. A product in accordance with claim 16 wherein the phenol-aldehyde condensation product is a resole.

21. A method of forming an infusible resin product which comprises forming an aldehyde-reactive bark phenolic acid resin from tree bark by a process which comprises mixing the bark with aqueous alkali metal hydroxide solution to form a mixture, heating said mixture in the absence of oxygen and at a temperature of approximately 200° C. to 260° C. to drive off volatile materials and form an alkali bark, forming an aqueous slurry of the alkali bark, acidifying the slurry to form a reactive bark phenolic acid resin, separating the bark phenolic acid resin, and mixing the bark phenolic acid resin with a phenol-aldehyde condensation product and a sufficient amount of an aldehyde source to cure the resin mixture to form a molding compound and molding and curing the molding compound to form an infusible resin product.

22. A method in accordance to claim 21 wherein the tree bark is from a coniferous tree.

23. A method in accordance with claim 21 wherein fibrous particles of the bark are removed from nonfibrous particles and the nonfibrous particles are mixed with the alkali metal hydroxide solution to form the mixture.

24. A method in accordance with claim 21 wherein the phenol-aldehyde condensation product is a novolac.

25. A method in accordance with claim 21 wherein the phenol-aldehyde condensation product is a resole.

26. A method in accordance with claim 21 wherein the bark phenolic acid resin and the phenol-aldehyde condensation product are mixed with a finely divided filler.

27. A method in accordance with claim 21 wherein the bark phenolic acid resin and the phenol-aldehyde condensation product are mixed with finely divided wood flour.

28. A method in accordance with claim 21 wherein substantially equal parts by weight of bark phenolic acid resin and phenol-aldehyde condensation product are mixed together.

29. A method in accordance with claim 21 wherein the molding compound consists essentially of 50 to 200 parts by weight bark phenolic acid resin, 100 parts phenol-aldehyde condensation product, and 150 to 300 parts finely divided wood flour.

30. A method in accordance with claim 21 wherein the weight of the bark phenolic acid resin is from 5 to 400 parts by weight per 100 parts of phenol-aldehyde condensation product.

References Cited

UNITED STATES PATENTS 3,371,054   2/1968   Blickensderfer et al. __ 260—17.2

WILLIAM SHORT, Primary Examiner

E. WOODBERRY, Assistant Examiner